Aug. 18, 1942.          L. HANKINS ET AL          2,293,137
                        LIQUID GAUGING DEVICE
                        Filed April 3, 1939          2 Sheets-Sheet 1

INVENTOR
LEVI HANKINS
E. R. HANKINS
BY
ATTORNEYS

Aug. 18, 1942.   L. HANKINS ET AL   2,293,137
LIQUID GAUGING DEVICE
Filed April 3, 1939   2 Sheets-Sheet 2

INVENTOR
LEVI HANKINS
E. R. HANKINS
BY
ATTORNEYS

Patented Aug. 18, 1942

2,293,137

UNITED STATES PATENT OFFICE 2,293,137

LIQUID GAUGING DEVICE

Levi Hankins and Emmet R. Hankins, Pasadena, Tex., assignors to Phillips Petroleum Company, a corporation of Delaware Application April 3, 1939, Serial No. 265,833

3 Claims. (Cl. 73—322)

This invention relates to gauging devices and more particularly to gauging devices which are especially adaptable for use in determining the volumetric contents of volatile liquids in closed containers. The description of the invention will, for the purposes of this specification, be confined to embodiments which are applicable to tank cars. While our invention may be advantageously employed in connection with tank cars containing volatile liquids such as liquefied petroleum gas, natural gasoline, and the like, it is to be understood that it is equally well suited for use with various types and designs of receptacles for storing volatile liquids.

Heretofore, it has been the practice to remove the dome cover of a tank car on two separate occasions for each shipment in order to measure the contents of the car. The loaded car is first gauged prior to shipment to enable the shipper to determine the amount of volatile liquid being shipped. The car is again gauged at its destination by the receiver. In each instance after the dome cover has been removed, a gauging stick is lowered into the open dome until it rests on the bottom of the car. A thermometer is also inserted through the open dome and immersed in the liquid for a sufficient length of time to obtain a correct temperature indication. With the reading on the stick and the temperature thus determined, the gauger then ascertains the volume corresponding thereto by reference to suitable tables. The above procedure necessitates the dome being open to the atmosphere for appreciable periods of time, during which considerable losses are incurred by evaporation of the liquid and escape to the atmosphere of gases thus formed, as well as the gas already in the car. These losses become costly over a period of time. In addition, open domes in tank cars are a constant hazard for many volatile liquids as there is always present in such cases the danger of explosion and injury to the health and well being of the individual engaged in gauging the car.

The use of the instant invention eliminates the expensive losses and the hazards to life and property experienced in the past. By its use there is no necessity for opening the dome cover to measure the contents of the car. Instead, both the liquid level and the temperature of the liquid may be readily ascertained from the outside of the car.

The primary object of this invention is to prevent gas losses while measuring the volume of volatile liquids in normally closed containers.

Another object of this invention is to provide a gauging device which is adaptable to be safely used in a positive and dependable manner for ascertaining the volume of volatile liquids in a closed container.

These and other objects and advantages will be readily apparent from the following description and annexed drawings, wherein Figure 1 is an elevation view partly in cross section, illustrating a preferred embodiment of the invention mounted in a tank car;

Figure 1:
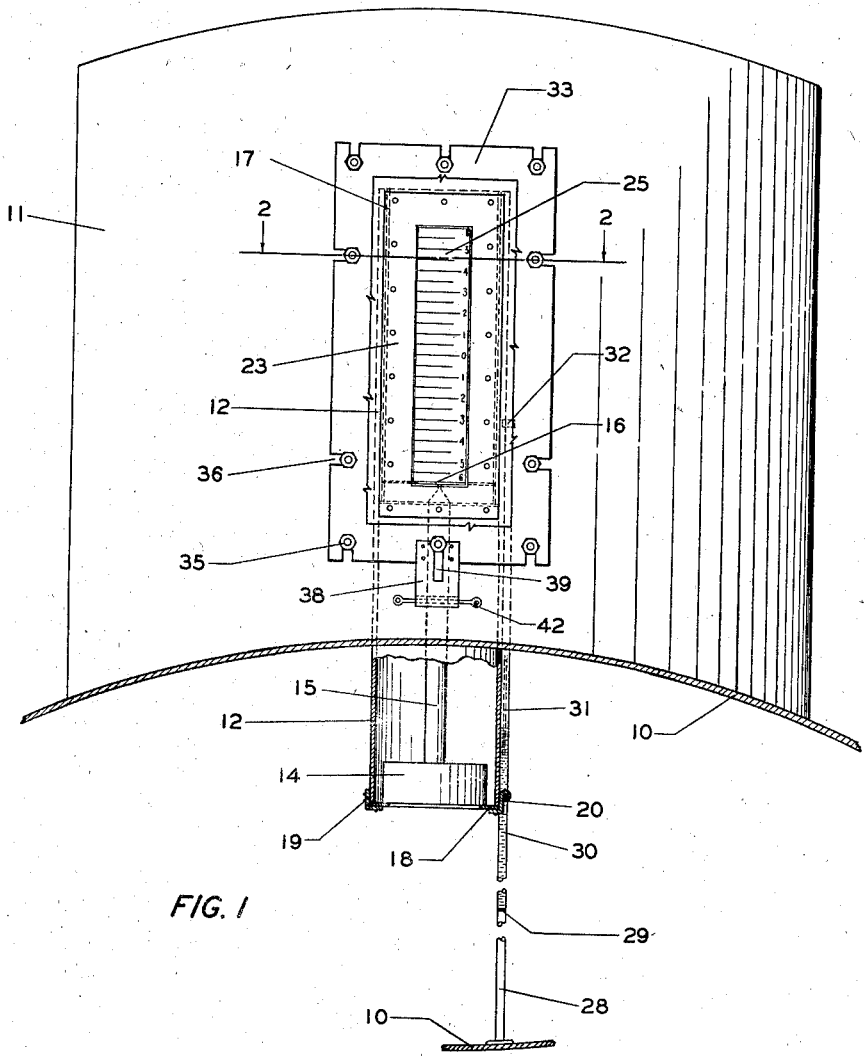
Figure 2:
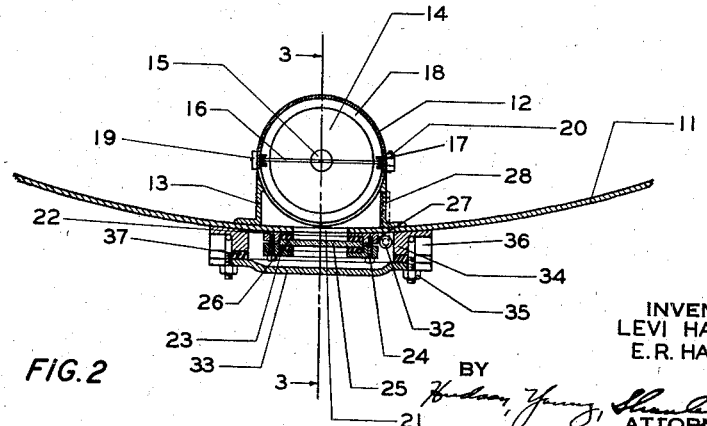
Figure 2 is a horizontal cross section view taken along line 2—2 of Figure 1.
Figure 3:
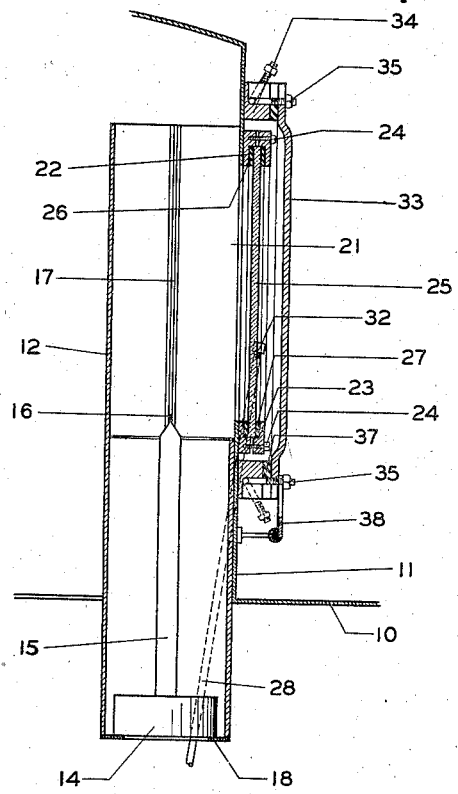
Figure 3 is a vertical cross section view taken along line 3—3 of Figure 2.
Figure 4:
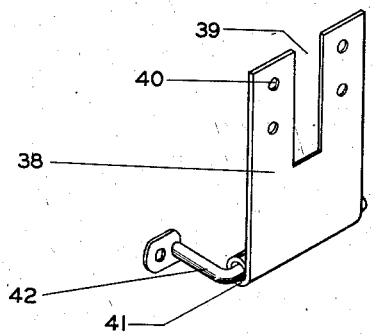
Figure 4 is a perspective view of the safety cover hinge plate and bracket.

Referring to the drawings, and more particularly to Figures 1, 2, and 3, we have denoted therein a conventional type of tank car having a main body or shell 10 and a dome 11. A cylindrical gauge chamber 12, which extends into the main body of the car, is supported adjacent the inner surface of the vertical wall of the dome by means of suitable brackets 13 which are preferably welded to both the chamber and the dome wall. In the interests of safety, accessibility and convenience this chamber is positioned so that the gauge glass, to be hereinafter described, faces the front or rear of the car rather than the side. Inside the gauge chamber and free to move vertically therethrough is a float gauge which consists of a buoyant base 14, a gauge rod 15 supported thereon, and a gauge arm 16 at right angles to the gauge rod. A pair of channel-shaped guiding members 17 are welded to the inner surface of the float chamber to receive the ends of gauge arm 16 and maintain the movement of the float gauge as a whole along a predetermined path. An annular ring 18 is hinged at 19 to the lower extremity of the chamber and is maintained in position by means of a clasp 20. Ring 18, when in the position illustrated, serves as a stop to restrict the downward movement of the float gauge. The hinge at 19 is to allow for the ready removal or insertion of the float gauge in the chamber.

Both the gauge chamber and the dome are provided with a rectangular opening as indicated by reference numeral 21, in order that the position of the float gauge may be observed from outside the car. Circumscribing this opening on the outer surface of the dome is a frame or gasket seat 22 which is welded to the dome. A second frame 23, having the same size rectangular opening as frame 22 and supported in proper alignment by a series of stud bolts 24, retains gauge glass 25 over opening 21 in the car dome. A pair of suitable gaskets 26 and 27 is placed between the gauge glass and the corresponding frame to form a hermetical seal between the edges of the dome opening 21 and the gauge glass. In this manner, objectionable gas and liquid-leakage, which might otherwise occur at the dome opening, are fully prevented. The gauge glass is fabricated of a heavy transparent plate glass of sufficient strength to withstand any pressure that may develop in the car. The glass is graduated so that the dome "innage" or "outage" may be readily ascertained by merely observing the position of arm 16 which serves as a reading bar in this embodiment of our invention.

In order to determine the temperature of the liquid contents of the car, we have provided a thermometer well 28 which consists of a tube having good heat conducting properties. The lower end of the tube is welded to the bottom of the car while the upper end projects through the car dome at a point adjacent the gauge glass. The tube is blocked off at 29 near the center of the main body of the car and a column of light oil 30 is supported thereabove so that a thermometer 31 may be inserted in the tube and immersed in the oil for the purpose of obtaining a true temperature reading of the liquid contents of the car. A readily removable closure 32 seals off the upper end of the thermometer well.

A safety cover 33 is employed in the instant invention to protect the gauge glass and the exposed end of the thermometer well against damage. This cover is supported in closed position through the cooperation of a heavy frame 34 which is welded to the dome and a plurality of swing bolts 35 which are connected to frame 34 and engage with slots 36. A gasket 37 is placed between the safety cover and its supporting frame to exclude moisture, dust and dirt from the interior of the cover while it is in closed position. A hinge plate 38, slotted at 39 to receive a swing bolt, is attached to the safety cover by means of rivets through holes 40 and is formed at its lower end into a bead 41 which engages with the central portion of a hinge bracket 42.

From the foregoing, it is believed that the construction, operation and advantages of our present invention will be readily understood by persons skilled in the art. It is to be clearly understood, however, that the form of our invention herewith shown and described is to be taken as a preferred example of the same and that various changes in the shape, size and arrangement of parts may be resorted to without departing from the spirit of our invention as defined by the appended claims.

We claim:

1. A liquid gauging device for closed containers comprising a chamber mounted in the container; a pair of substantially vertical grooved guide members in the chamber; a float gauge in the chamber; said float gauge including a base, a gauge rod supported thereupon and a gauge arm connected to the gauge rod and having its ends slidably cooperating with the grooved guide members for maintaining the movement of the float gauge along a predetermined path; a stop removably connected to the lower portion of the chamber; and means for observing the position of the float gauge from the exterior of the container.

2. A liquid gauging device for closed containers comprising a chamber mounted in the container; a float gauge in the chamber; said float gauge including a base, a gauge rod supported thereupon and a gauge arm connected to the gauge rod; guide means within the chamber cooperating with the gauge arm and permitting substantially vertical lineal movement of the float gauge but preventing rotational movement thereof about a vertical axis; and means for observing the position of the float gauge from the exterior of the container.

3. A liquid gauging device for closed containers comprising a chamber mounted in the container; a float gauge in the chamber; said float gauge including a base, a gauge rod supported thereupon and a gauge arm connected to the gauge rod; guide means within the chamber cooperating with the gauge arm and permitting substantially vertical lineal movement of the float gauge but preventing rotational movement thereof about a vertical axis; a stop removably connected to the lower portion of the container; and means for observing the position of the float gauge from the exterior of the container.

LEVI HANKINS.
EMMET R. HANKINS.